United States Patent [19]
Farr

[11] 4,422,693
[45] Dec. 27, 1983

[54] VEHICLE BRAKING SYSTEMS

[75] Inventor: Glyn Phillip R. Farr, Leek Wooton, England

[73] Assignee: Lucas Industries Limited, Birmingham, England

[21] Appl. No.: 408,854

[22] Filed: Aug. 17, 1982

Related U.S. Application Data

[63] Continuation-in-part of Ser. No. 148,670, May 12, 1980, abandoned.

[30] Foreign Application Priority Data

May 10, 1979 [GB] United Kingdom ............... 7916298

[51] Int. Cl.³ .................... B60T 8/16; B60T 8/26
[52] U.S. Cl. ...................... 303/24 A; 303/24 C
[58] Field of Search .......... 303/24 R, 24 C, 24 A, 303/24 B, 24 F, 24 BB, 6 C, 6 R, 22 R, 22 A, 100, 113–119, 61–63, 68–69, 84 R, 84 A; 188/195, 349, 181; 137/38, 39, 45, 46

[56] References Cited

U.S. PATENT DOCUMENTS

| | | | |
|---|---|---|---|
| 2,796,154 | 6/1957 | Stelzer | 303/24 A |
| 3,276,822 | 10/1966 | Lister et al. | 303/24 F |
| 3,741,610 | 6/1973 | Holland | 303/24 F X |
| 4,225,192 | 9/1980 | Dufft | 303/24 A |
| 4,245,868 | 1/1981 | Farr | 303/24 A X |

*Primary Examiner*—Douglas C. Butler
*Attorney, Agent, or Firm*—Scrivener, Clarke, Scrivener and Johnson

[57] ABSTRACT

A vehicle brake control device especially suitable for load carrying vehicles comprises a device for sensing front and rear brake pressure and vehicle deceleration, and a control device for maintaining the relationship $$AP_1 - BP_2 + C = Df$$

where $P_1$ is the front brake pressure, $P_2$ is the rear brake pressure, f is the sensed deceleration, and A,B,C and D are constants with A greater than B.

4 Claims, 5 Drawing Figures

VEHICLE BRAKING SYSTEMS

This application is a continuation-in-part of application Ser. No. 06/148,670 filed May 12, 1980, now abandoned.

This invention relates generally to vehicle braking systems.

Braking systems commonly have a fluid pressure source, which may be a pedal-operated master cylinder, which supplies pressure directly to the front wheel brakes and through a brake pressure control valve arrangement to the rear brakes. The valve arrangement is generally arranged to modify, in dependence upon vehicle loading, the rear brake pressure as compared to front brake pressure, to reduce the risk of rear wheel lock.

In some systems the vehicle load is sensed by a mechanical linkage which is connected between the sprung and unsprung parts of the vehicle and which applies a load to the valve arrangement. The linkage senses the deflection between the vehicle parts and applies a load corresponding to the sensed deflection. In this way a higher pressure is passed to the rear brakes when the vehicle is fully laden than when it is unladen.

On assembly of the vehicle, the valve arrangement and linkage are set to provide a desired pre-load for a given vehicle load. Such valves and linkages have the disadvantage that during use the vehicle suspension settles which requires that the valve and the linkage have to be frequently reset to compensate for settling. Furthermore, during extreme vehicle deflections there is the possiblity of over-travel damage and excessive loading in the linkage system which requires complex lost motion and over-travel mechanisms. Also the linkages have to be sufficiently robust to withstand transient suspension loads.

To overcome the problems associated with the mechanical link, it has been proposed to provide valve arrangements which are responsive to vehicle deceleration, and thus vehicle load. Such valve arrangements have an inertia-responsive device, for example a pendulum, which is movable to actuate a switching arrangement which operates the valve. Thus, the operation of the valve and the pressure at which the rear brake pressure starts to be modified, commonly referred to as the cut-in pressure, is dependent upon the vehicle deceleration. One problem associated with such valve arrangements is that in an emergency braking situation, a high pressure is passed to the rear brakes before the pendulum effects operation of the valve, with the result that a higher pressure than is desirable for the particular vehicle load is trapped in the rear wheel brake actuators. The high rear brake pressure could cause rear wheel lock in that situation in which it is least desirable, namely emergency braking.

In the specification of our British Patent Application No. 2,010,996 we described several arrangements which overcome the last-mentioned problem. In those arrangements the rear brake pressure is continuously modified in response to the deceleration of the vehicle as sensed by a pendulum, and there is no switching action. In that way, if a higher pressure than is desirable is passed to the rear brakes during emergency braking, the pressure is reduced when the deceleration of the vehicle is sensed, so that the high pressure is not trapped in the rear brake cylinders and the risk of rear wheel lock is reduced.

The aim of the present invention is to provide an improved brake pressure regulating device which in use can continuously modify rear brake pressure in response to vehicle deceleration.

In accordance with the invention, there is provided a pressure regulating device for a vehicle braking system in which a continuous supply of brake actuating fluid is available from a power source, the device comprising: an inlet for receiving brake actuating fluid from said power source; an outlet for connection to a rear brake of the vehicle; sensing means for sensing deceleration of the vehicle; valve means for connecting the outlet to the inlet in order to supply fluid from the inlet to the outlet to increase the pressure supplied to the rear brake and for connecting the outlet to exhaust in order to reduce the pressure supplied to the rear brakes; and control means for controlling operation of said valve means, said control means being responsive to a control pressure selected by the driver of the vehicle, to rear brake pressure of the vehicle, and to said sensing means, and being operative at any particular control pressure to operate the valve means to maintain the relationship:

$$AP_1 - BP_2 + C = Df$$

where:
$P_1$ is the control pressure;
$P_2$ is the rear brake pressure;
f is the sensed deceleration; and
A,B,C, and D are constants with A being greater than B.

The device in accordance with the invention is operable to continuously balance the inlet pressure, which is in use the pressure applied to the front brakes or the equivalent pressure supplied by the other chamber of a tandem type master cylinder, against the rear brake pressure and the vehicle deceleration.

Other features of the invention will be apparent from the following description of embodiments of the invention.

Several forms of brake pressure regulating devices in accordance with the invention will now be described, by way of example with reference to the accompanying drawings, in which.

Figure 1:
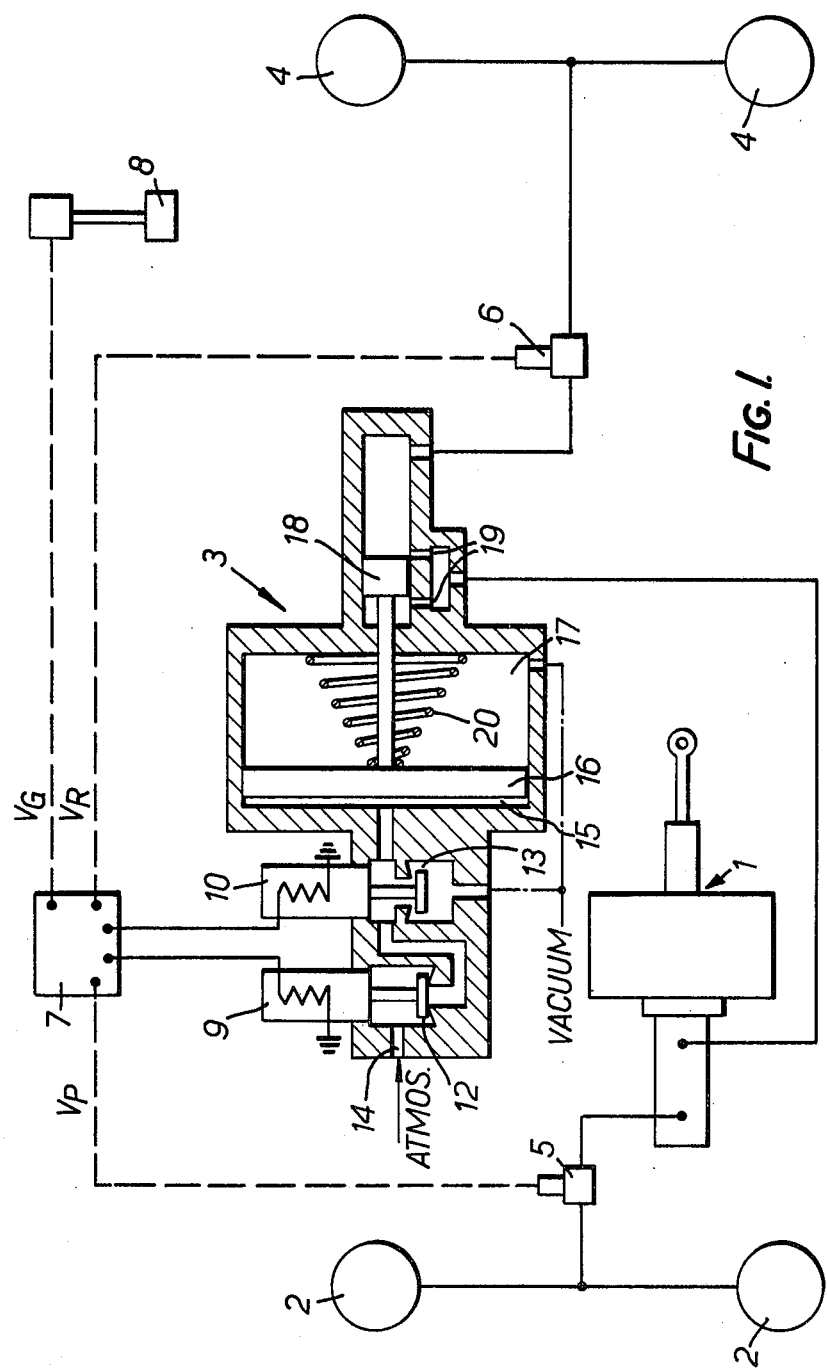
FIG. 1 is a diagrammatic view of a braking system incorporating one form of brake pressure regulating device.

The system of FIG. 1 illustrates the basic principle of operation of the pressure regulating devices according to the invention. The system comprises a source 1 in the form of a tandem master cylinder connected directly to the front wheel brakes 2 and through a regulating device 3 to the rear wheel brakes 4. Transducers 5,6 are connected respectively in the front and rear brake pressure lines and are operable to pass to a comparator 7 electrical signals $V_p, V_R$ indicative of the front and rear wheel brake pressures. A deceleration sensor 8 also passes to the comparator an electrical signal $V_G$ indicative of the vehicle deceleration.

The comparator 7 is arranged to operate solenoids 9,10 which control valves 12,13. Valve 12 is operable to control flow from an opening 14 to atmosphere and a chamber 15 on one side of a piston 16 of a booster. The chamber 17 on the other side of piston 16 is connected to vacuum. Valve 13 controls flow between chamber 15 and vacuum.

Connected to piston 16 is a smaller piston 18 which co-operates with openings 19 to control the passage of pressure from the source 1 to the rear brakes 4.

In normal operation, the valves adopt the illustrated conditions, i.e. valve 12 closed and valve 13 open, so that pistons 16,18 are biased by a spring 20 to their illustrated positions and full braking pressure can be passed to the rear brakes 4. If the signals fed to the comparator are such that $V_P > V_R + V_G$, the valve 12 opens and valve 13 closes creating a pressure differential across piston 16 and moving the pistons 16,18 to the right and closing off communication between the source 1 and the rear brakes 4. In so doing, the piston 18 increases the pressure in the rear brakes as compared to the source pressure. When $V_P = V_R + V_G$, the valve 12 is closed with valve 13 also being closed so that a balance is attained. When the master cylinder pressure ($V_P$) is reduced, the $V_P < V_R + V_G$ and the valve 12 remains closed and valve 13 opens to re-admit vacuum to the chamber 15, thereby reducing the effective boost assistance of piston 16, and consequently reducing the rear wheel brake pressure.

By choosing transducers which produce an output directly proportional to the variables to which they are sensitive we have:

$$V_P = AP_1$$

$$V_R = BP_2$$

$$V_G = Df$$

where:
$P_1$ = front brake pressure
$P_2$ = rear brake pressure
f = sensed deceleration
and A,B, and D are constants.

Thus, the condition of balance may be rewritten as:

$$AP_1 - BP_2 = Df.$$

By selecting the constant A to be greater than constant B a particularly advantageous arrangment is produced in which the rear brake pressure is increased by a proportionately larger amount that the front brake pressure in response to an increased vehicle load.

Figure 2:
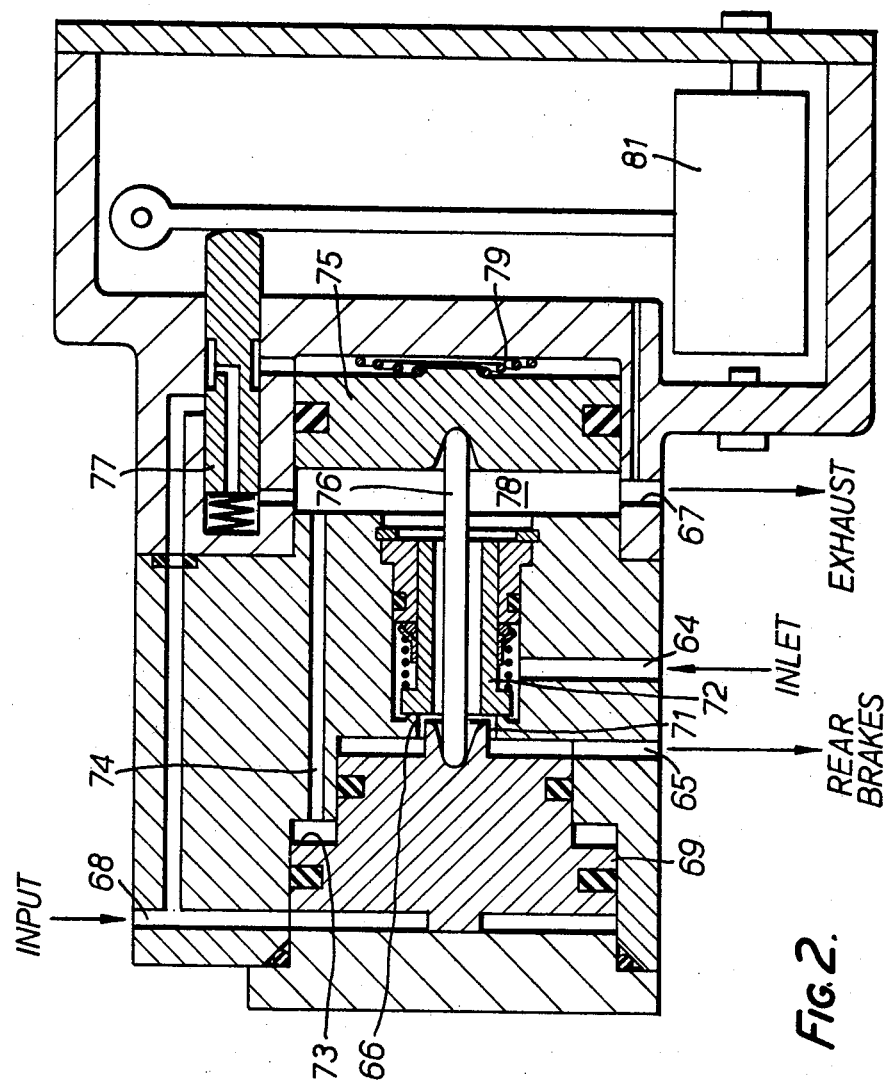
FIG. 2 is an axial cross-sectional view of a further form of pressure regulating device.
Figure 3:
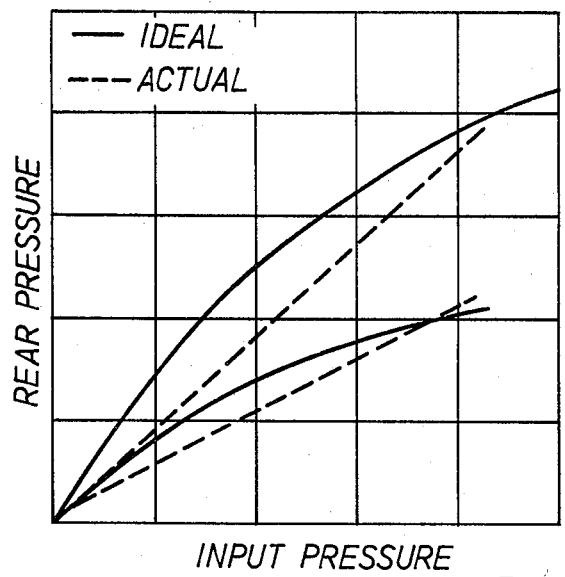
FIG. 3 is a graph of rear brake pressure vs. front brake pressure for a braking system incorporating the regulating device of FIG. 2 but is applicable to braking systems incorporating the regulating device of FIG. 1.

With reference to FIGS. 2 and 3, there is shown a different form of regulating device for a pneumatic system. The device comprises a housing having an inlet 64 for connection to an accumulator, an outlet 65 for connection to the rear wheel brakes, a relay valve 66 controlling communication between the inlet 64 and the outlet 65 and between the outlet 65 and an exhaust 67 and an input 68 for connection to a brake actuating arrangement (not shown), the input 68 being pressurised when the brakes are applied. The input pressure acts on one face of a differential area piston 69 which carries a valve seat 71 so that when the input pressure is applied the piston 69 moves to the right to close off communication between the outlet 65 and exhaust 67 and urge a valve member 72 to the right to open communication between the inlet 64 and the outlet 65 thereby pressurising the brakes. The shoulder portion 73 of piston 69 is subjected to exhaust pressure through a passageway 74.

Because of the differential areas of piston 69 and, there being either no deceleration signal, or only a small signal the rear brake pressure is boosted as compared to the input pressure.

An auxiliary piston 75 is interconnected with the piston 69 by a rod 76. An auxiliary valve comprises a spool 77 which in the inoperative condition illustrated, communicates chamber 78 and 79 on opposite sides of the piston 75 with each other, the left hand chamber 78 being open to exhaust through port 67.

When deceleration of the vehicle is sensed, a pendulum 81 swings to the left to urge the spool 77 leftwardly to cut-off communication between the exhaust port 67 and the chamber 79 and to open communication between that chamber 79 and the input 68, thereby applying a force in opposition to the input pressure force acting on the larger area face of the piston 69. If the deceleration is sufficient, the force in opposition to piston 69 urges the pistons leftwardly to actuate the valve 66 and return it to the illustrated position, closing communication between the inlet 64 and the outlet 65 and opening communication between the outlet 65 and exhaust 67. Thus the rear brake pressure is reduced.

It will be appreciated that the rear brake pressure is continuously altered in dependence upon the input pressure and sensed deceleration.

It should be apparent from the description relative to FIG. 2 that the control means for controlling the operation of the valve means is responsive: 1. to control pressure selected by the driver of the vehicle and operating on the left face of piston 69; 2. to rear brake pressure of the vehicle operating on the right hand, reduced area face of the piston 69; and 3. to the means for sensing the deceleration of the vehicle and, in the embodiment of FIG. 2, is the deceleration related pressure acting on the right face of the auxiliary piston 75.

The relationship which is maintained by the described forces can be expressed by the following formula:

$$AP_1 - BP_2 + C = Df$$

where:
$P_1$ is the control pressure;
$P_2$ is the rear brake pressure;
f is the sensed deceleration; and
A,B,C and D are constants,
A being greater than B.

For the pressure responsive system shown in FIG. 2, A and B are the respective areas of the left and right side of the piston 69; C is simply a spring constant determined by the spring which normally holds the valve in the open position of FIG. 2; D is the area of the right face of piston 75 and f is the deceleration related pressure acting on that face, that is to say, a pressure which is proportional to deceleration.

FIG. 3 shows in full lines the ideal brake pressure curves for the laden and unladen conditions of the vehicle, as compared to the actual curves, shown in broken lines, obtained with the regulating device of FIG. 2.

Figure 4:
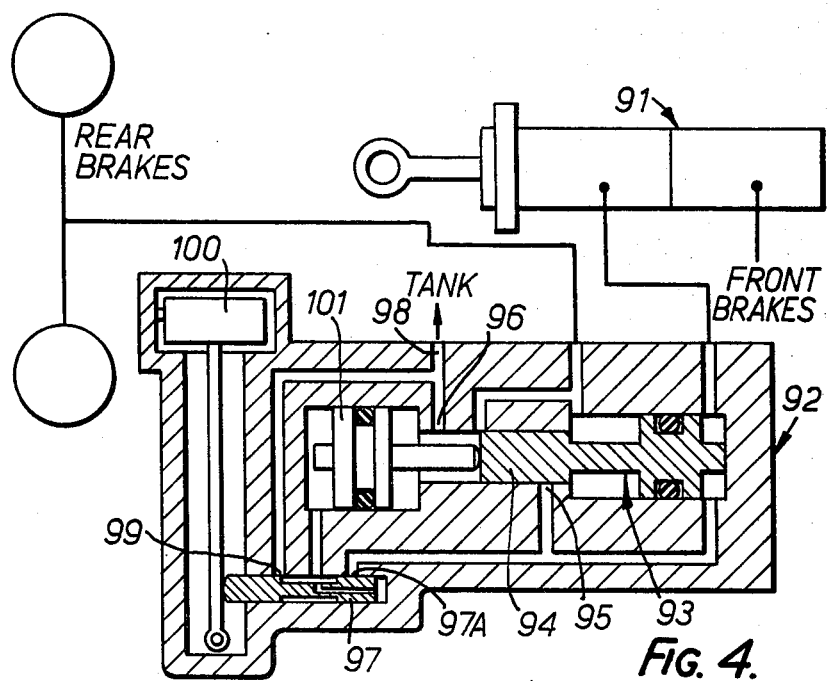
FIG. 4 is an axial cross-sectional view of a further embodiment of the invention.

The device can also be adapted for use on an agricultural tractor for controlling the brakes of an attached trailer. In this case the large rear wheel tractor brakes operate as the front brakes and the trailer brakes adopt the role of the rear brakes. In this installation the deceleration apportioning valve will be constructionally similar in principle to the FIG. 2 embodiment, and is shown in FIG. 4. A tandem power valve 91 supplies pressurised hydraulic fluid to both sets of brakes, directly to the tractor brakes and via the device 92 to the trailer rear brakes. The input pressure is applied to the right-hand face of a piston differential area piston 93, to an outlet port 95, and via a port 97A to a spool valve 97. When the brakes are applied, initial inlet pressure acting on piston 93, urges the piston leftwardly. An exhaust port 96, which connects the rear brake pressure line to a return to tank line 98, is covered by the lefthand portion 94 of the piston 93. Further leftward movement uncovers port 95, thereby admitting inlet pressure to the annular left-hand face of piston 93.

As the pressure so admitted to the rear brakes, in conjunction with the tractor brake pressure initiates deceleration, the pendulum deceleration sensor 100 urges the spool valve 97 to close a port 99 which is connected to tank and open the port 7a. The inlet fluid pressure is thereby admitted to the lefthand face of a piston 101. The pistons 101,93 thereupon return rightwardly to reclose port 95 and re-open port 96. The increasing inlet pressure causes this action to repeat as a metering pressure reduction cycle, the level of inlet pressure admitted to the piston 101 being dependent on the level of deceleration as in the previously described devices.

Figure 5:
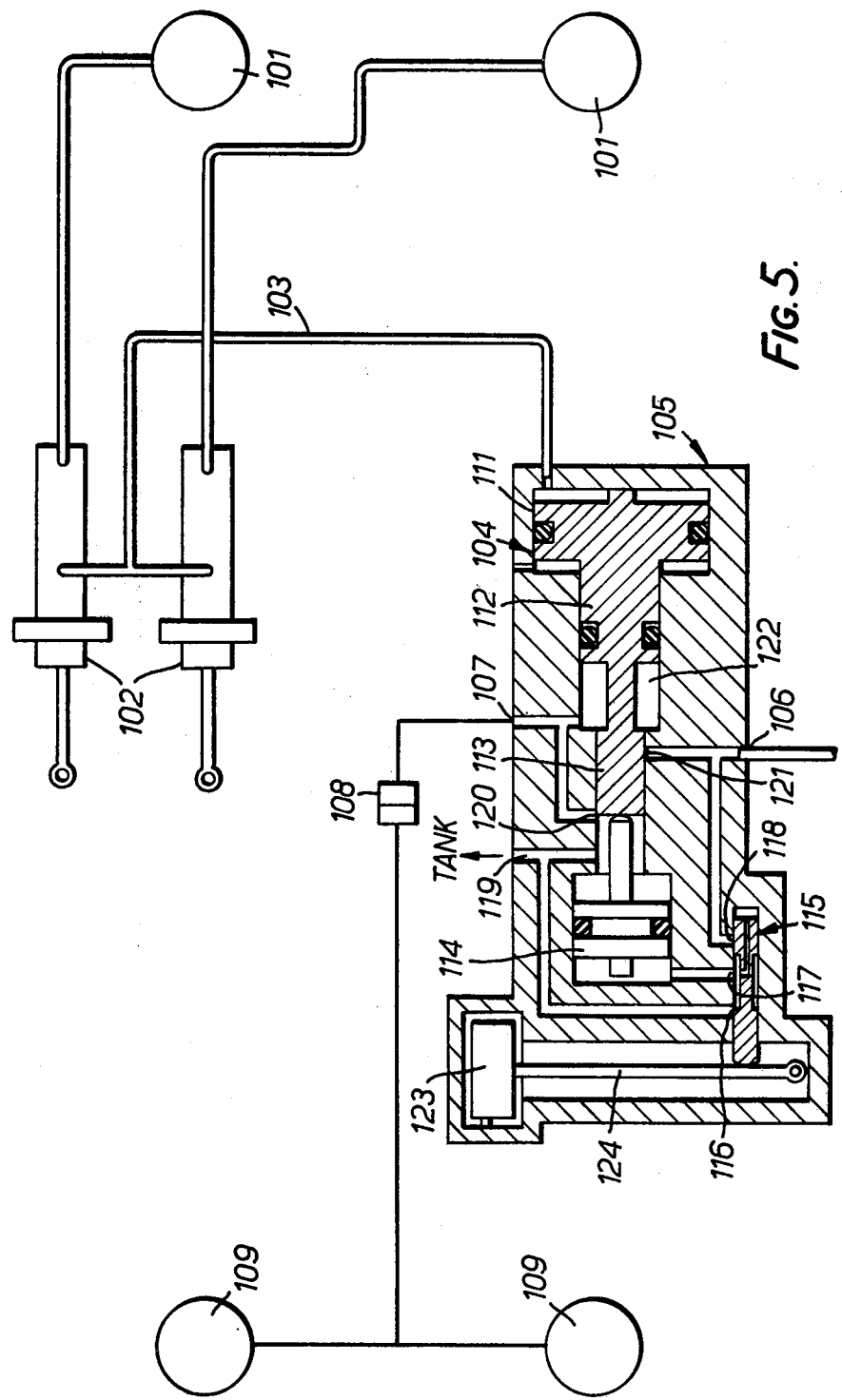
FIG. 5 is an axial cross-sectional view of another form of device in a tractor and trailer braking system having hydrostatic tractor brakes and full power trailer brakes.

The braking system of FIG. 5 comprises tractor brakes 101 actuated by dual compensating master cylinders or by power metering valves 102. The master cylinders 102 also supply hydrostatic pressure through a conduit 103 to the right hand face of a stepped piston 104 of the regulating device 105. The regulating device 105 is illustrated in its inoperative condition and has an inlet 106 connected to a power supply (not shown), which may for example be an accumulator or variable delivery pump, and an outlet 107 connected via a coupling 108 to the trailer brakes 109.

The stepped piston has three effective portions 111,112 and 113, the left hand portion 113 being engaged by a separate piston 114.

A spool valve 115 controls communication between ports 116,117,118 which are respectively connected to an opening 119 to tank, the left hand face of piston 114 and inlet 106.

When the master cylinders 102 are actuated, the hydrostatic pressure acting on the right hand portion 111 of piston 104 urges the latter leftwardly to close a port 120 connected to outlet 107 and to open a port 121 connected to inlet 106. Thus, the pressure from the power source is passed through a chamber 122 to the outlet 107 and thus to the trailer brakes 109. The consequent braking causes a pendulum 123 and associated arm 124 to pivot, thereby urging the spool valve 115 rightwardly. Almost simultaneously, the full flow inlet pressure, whilst being admitted to the trailer brakes, also acts on the lefthand face of intermediate piston portion 112, and furthermore, passes via ports 118 and 117 to the lefthand face of piston 114, the port 116 being closed. Therefore, as soon as the accumulator, or pump pressure, is admitted to the rear trailer brakes, it is automatically reduced by metering, the forces acting leftwardly returning pistons 114 and 104 against the hydrostatic control pressure, all being dependent on the level of deceleration, which in turn is dependent on trailer load.

Thus, if the tractor is pulling an unladen trailer, the hydrostatic displacement caused by the intermediate piston portion 112 may be sufficient to operate the brakes in which case the apportioning valve ensures that the pressurised brake fluid is not admitted to the outlet 107. In the fully laden case, the full accumulator pressure may be admitted to the trailer brakes as described above, before the pendulum 123 has moved the pilot spool valve 115 sufficiently to allow pressure to develop at the left hand face of piston 114 and overcome the pressure applied to piston 111. Thus, the deceleration apportioning mechanism determines the required level of braking wholly in dependence on trailer load.

This arrangement also satisfies the equation $$AP_1 - BP_2 = Df$$

as outlined above where:
$P_1$ = pressure in pipe 103
$P_2$ = trailer brake pressure
$f$ = sensed deceleration.

This is a particularly advantageious system for such installations as an agricultural tractor and trailer combination. The trailer weight can vary from less than that of the towing tractor in the unladen case, to a level much greater than that of the tractor in the laden case. The regulating device automatically regulates trailer brake pressure in dependence on vehicle load, and permits hydrostatic brake operation of the tractor brakes only. This feature permits braking in the non-towing circumstances when only the tractor itself needs to be stopped, there being none of the inertia or momentum forces applied through the drawbar link by the trailer.

It will be appreciated that although in each of the above-described embodiments the vehicle deceleration is sensed using a pendulum, other sensing means could be used. For example the angular deceleration of a rear wheel could be sensed to provide a signal proportional to vehicle deceleration for modifying the rear wheel brake pressure.

In each of the above described embodiments, the rear brake pressure is increased or reduced relative to front brake pressure in dependence upon vehicle deceleration, which is indicative of vehicle loading. Thus, if the vehicle load is increased, the rear brake pressure can be increased and if load is reduced, the rear brake pressure can be reduced relative to front brake pressure.

The pressure regulating devices continuously vary rear brake pressure in response to deceleration signal and there is no "switching" action, as in previously proposed devices. Furthermore, it has been found that a single pressure regulating device as described above is suitable for a wide range of vehicles, from relatively light weight cars to heavy lorries. In previously proposed devices, different sizes had to be made for different sizes of vehicle.

The above-described devices also have the advantage that the booster is self-assisting in that the generated pressure assists the driver input. Additionally, the devices operate correctly when the vehicle is ascending or descending a hill. When going downhill the pendulum acts to actuate the valves which ensure that rear brake pressure is reduced and when going uphill the rear brake pressure is increased, both conditions being precisely what is required.

I claim:

1. A pressure regulating device for a vehicle braking system in which a continuous supply of brake actuating fluid is available from a power source, the device comprising: an inlet for receiving brake actuating fluid from said power source; an outlet for connection to a rear brake of the vehicle; sensing means for sensing deceleration of the vehicle; valve means for connecting the outlet to the inlet in order to supply fluid from the inlet to the outlet to increase the pressure supplied to the rear brake and for connecting the outlet to exhaust in order to reduce the pressure supplied to the rear brakes; and control means for controlling operation of said valve means, said control means being responsive to a control pressure selected by the driver of the vehicle, to rear brake pressure of the vehicle, and to said sensing means, and being operative at any particular control pressure to operate the valve means to maintain the relationship:

$$AP_1 - BP_2 + C = Df$$

where:

$P_1$ is the control pressure;
$P_2$ is the rear brake pressure;
f is the sensed deceleration;
A, B, and D are constants with A being greater than B; and C is an optional constant.

2. A pressure regulating device according to claim 1 wherein said control means comprises a first piston which is subject on one side thereof to said control pressure and on the other side thereof to rear brake pressure and a second piston which is coupled to the first piston and is subject on one side thereof to a pressure proportional to sensed deceleration, and wherein said rear brake pressure and said pressure proportional to sensed deceleration tend to move said pistons in the direction to isolate said outlet from said inlet and to connect said outlet to exhaust.

3. A pressure regulating device according to claim 1 or claim 2 wherein the control pressure is the pressure subsisting at said inlet, the pressure subsisting at said inlet being selectable by the driver of the vehicle upon braking.

4. A pressure regulating device according to claim 1 or claim 2 wherein said inlet is permanently connected to said power source.

* * * * *